(12) United States Patent
Gu et al.

(10) Patent No.: US 8,989,809 B2
(45) Date of Patent: Mar. 24, 2015

(54) MOBILE TERMINAL USING COMMON ANTENNA FOR PERFORMING NFC FUNCTION AND FM-TX FUNCTION

(75) Inventors: Jianliang Gu, Huizhou (CN); Zihua Lin, Huizhou (CN); Lei Zhang, Huizhou (CN)

(73) Assignee: Huizhou TCL Mobile Communication Co., Ltd., Huizhou (CN)

( * ) Notice: Subject to any disclaimer, the term of this patent is extended or adjusted under 35 U.S.C. 154(b) by 18 days.

(21) Appl. No.: 13/979,301

(22) PCT Filed: Apr. 17, 2012

(86) PCT No.: PCT/CN2012/074228
§ 371 (c)(1),
(2), (4) Date: Jul. 11, 2013

(87) PCT Pub. No.: WO2012/142942
PCT Pub. Date: Oct. 26, 2012

(65) Prior Publication Data
US 2013/0288740 A1   Oct. 31, 2013

(30) Foreign Application Priority Data
Apr. 21, 2011   (CN) .......................... 2011 1 0100927

(51) Int. Cl.
*H04B 1/00* (2006.01)
*H01Q 1/24* (2006.01)
*H04W 88/06* (2009.01)

(52) U.S. Cl.
CPC ............. *H04B 1/0053* (2013.01); *H04W 88/06* (2013.01); *H01Q 1/243* (2013.01); *H04B 1/006* (2013.01); *H04B 1/406* (2013.01)
USPC ......................................... 455/552.1; 726/35

(58) Field of Classification Search
CPC ............................... H04W 88/06; G06F 21/88
USPC ................. 455/205, 41.1, 552.1, 78; 726/35
See application file for complete search history.

(56) References Cited

U.S. PATENT DOCUMENTS

| 2008/0080451 | A1 | 4/2008 | Rofougaran |
| 2009/0262022 | A1* | 10/2009 | Ying ....................... 343/700 MS |
| 2010/0273440 | A1 | 10/2010 | Bu |
| 2013/0023223 | A1* | 1/2013 | Rofougaran et al. .......... 455/205 |
| 2013/0065524 | A1* | 3/2013 | Rofougaran ................. 455/41.1 |

FOREIGN PATENT DOCUMENTS

| CN | 200956574 Y | 10/2007 |
| CN | 101154949 | 4/2008 |
| CN | 101877619 | 11/2010 |

(Continued)

OTHER PUBLICATIONS

International Search Report for PCT/CN2012/074228 dated Jul. 12, 2012.

*Primary Examiner* — Phuoc H Doan
(74) *Attorney, Agent, or Firm* — Lowe Hauptman & Ham, LLP

(57) ABSTRACT

A mobile terminal using a common antenna to perform an NFC function and an FM-TX function is provided. The mobile terminal includes a baseband chip, an NFC chip, an FM chip, and an antenna. The NFC chip and the FM chip are connected to the baseband chip. The mobile terminal also comprises a selecting unit connected to the baseband chip, the NFC chip, the FM chip, and the antenna, for conducting the NFC chip and the antenna or conducting the FM chip and the antenna based on a control of the baseband chip. The mobile terminal proposes a single antenna for performing the NFC function and the FM-TX function. A passage between corresponding functions is conducted through the selecting unit. It is unnecessary to use an additional antenna inside the mobile terminal. Thus, the mobile terminal has more spacious capacity, and the cost of the mobile terminal is reduced.

4 Claims, 1 Drawing Sheet

(56) References Cited

FOREIGN PATENT DOCUMENTS

| | | |
|---|---|---|
| CN | 101877619 A | 11/2010 |
| CN | 102158236 | 8/2011 |
| CN | 102170295 | 8/2011 |
| KR | 20070102831 | 10/2007 |

* cited by examiner

MOBILE TERMINAL USING COMMON ANTENNA FOR PERFORMING NFC FUNCTION AND FM-TX FUNCTION

CROSS REFERENCE TO RELATED APPLICATION

This application claims the priority of Chinese Patent Application No. 201110100927.9, filed on Apr. 21, 2011 in the SIPO (State Intellectual Property Office of the P.R.C.). Further, this application is the National Phase application of International Application No. PCT/CN2012/074228 filed on Apr. 17, 2012, which designates the United States.

BACKGROUND OF THE INVENTION

1. Field of the Invention

The present invention relates to a mobile terminal using an antenna for performing a sending function, and more particularly, to a mobile terminal utilizes a common antenna for performing an NFC function and an FM-TX function.

2. Description of the Prior Art

Nowadays, an intelligent mobile terminal has two functions: an NFC (near field communication) near-distance transmission system and an FM-TX (frequency modulation-transmitter) sending function. To match each of the functions, designing a corresponding antenna is required.

Furthermore, the intelligent mobile terminal usually comprises a WIFI antenna, a bluetooth antenna, and an antenna belonging to the wireless communication. This kind of mobile terminal is equipped with at least five antennae. Today's terminals require smaller quantity and powerful functions. But, the more the antennae are used, the larger capacity the terminal has to have. And distance between each of antennae should be taken into consideration. It becomes harder to design the terminal when too many antennae have to be used. Besides, the cost depends on how many antennae are used. The cost will increase when the terminal comprises too many antennae. This kind of terminal does not fulfill the requirement of electronic products which should have more various functions, smaller quantity, and a lower price.

So, the conventional terminal still needs to be improved.

SUMMARY OF THE INVENTION

An object of the present invention is to provide a mobile terminal using a common antenna comprising the NFC function and the FM-TX function. By reducing the number of the antenna inside the mobile terminal, the mobile terminal has more spacious capacity.

According to the present invention, a mobile terminal using a common antenna to perform an NFC function and an FM-TX function is provided. The mobile terminal comprises a baseband chip, an NFC chip, an FM chip, and an antenna, the NFC chip and the FM chip being connected to the baseband chip, respectively. The mobile terminal also comprises a selecting unit connected to the baseband chip, the NFC chip, the FM chip, and the antenna, respectively, for conducting the NFC chip and the antenna or conducting the FM chip and the antenna based on a control of the baseband chip.

In one aspect of the present invention, the baseband chip is used for controlling working status of the FM chip and conduction of the selecting unit, the baseband chip commands the FM chip to start to work and meanwhile commands the selecting unit to conduct the FM chip and the antenna (101), and the baseband chip commands the FM chip to stop working and meanwhile commands the selecting unit to conduct the NFC chip and the antenna (101).

In another aspect of the present invention, the antenna is a dual-band antenna.

In another aspect of the present invention, the selecting unit is a switch. The switch comprises two fixed contact points, and the two fixed contact points are connected to the NFC chip and the FM chip, respectively.

In another aspect of the present invention, the mobile terminal is a cellphone or a mobile TV.

The mobile terminal provided by the present invention realizes that a single antenna is used for performing the NFC function and the FM-TX function. A passage between corresponding functions is conducted through the selecting unit. It is unnecessary to use an additional antenna inside the mobile terminal. Thus, the mobile terminal has more spacious capacity, and the cost of the mobile terminal is reduced.

DETAILED DESCRIPTION OF THE PREFERRED EMBODIMENTS

The present invention proposes a mobile terminal using a common antenna comprising an NFC function and an FM-TX function. In order to make objectives, solutions and advantages of the present invention more clear and definite, embodiments of the present invention will be further described in detail with reference to the appended drawings. It should be understood that the embodiments are described only for explaining the present invention rather than limiting the present invention.

A frequency of an NFC radio signal is 13.5 MHz. A frequency of an FM radio signal is from 76 MHz to 108 MHz. For a wireless signal, both of the NFC radio signal and the FM radio signal are in the low-frequency range. The resonance point of the two signals are in the low-frequency range. So the NFC antenna of the mobile terminal can substitute for the FM antenna when being used, and vice versa. Based on this principle, a mobile terminal using a common antenna comprising the NFC function and the FM-TX function is provided.

Figure 1:
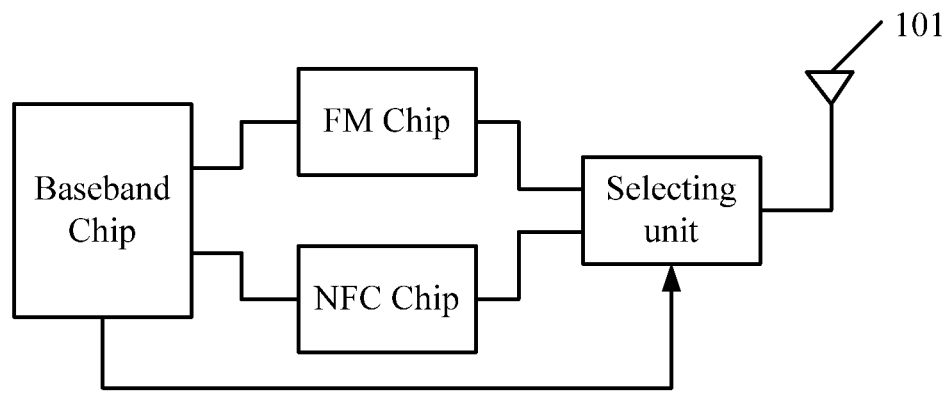
FIG. 1 is a block diagram of a mobile terminal using a common antenna comprising the NFC function and the FM-TX function according to the present invention.
Figure 2:
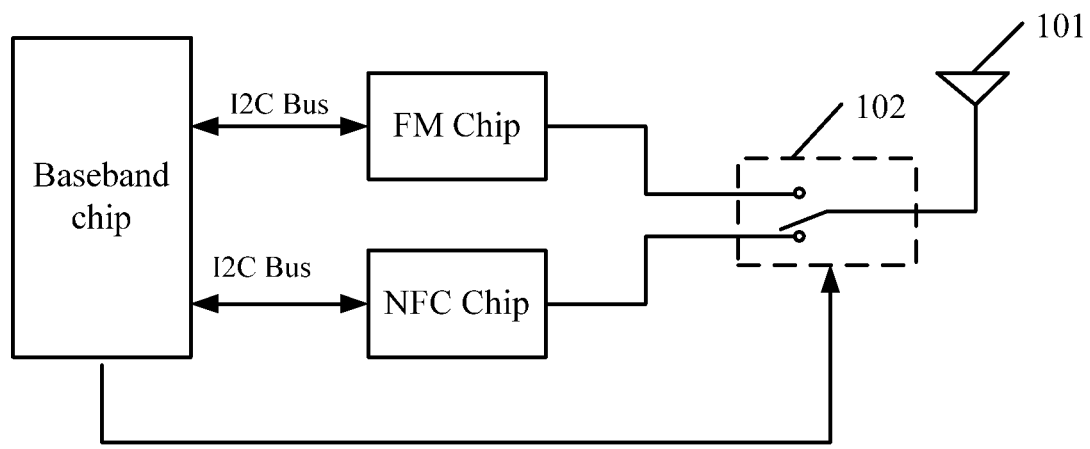
FIG. 2 is a principle diagram of a mobile terminal using a common antenna comprising the NFC function and the FM-TX function according to the present invention.

Please refer to FIG. 1 and FIG. 2 showing a mobile terminal using a common antenna comprises a baseband chip, an NFC chip, an FM chip, an antenna 101, and a selecting unit. The common antenna can be used for performing an NFC function and an FM-TX function.

The NFC chip is connected to the baseband chip through an I2C bus for realizing near-distance transmittance function. The FM chip comprises a TX sending function and is connected to the baseband chip through the I2C bus for generating digital audio broadcasting (DAB) signal. The selecting unit is connected to the baseband chip, the NFC chip, the FM chip, and the antenna 101, respectively. The selecting unit is used for optionally conducting the NFC chip and the antenna 101 or conducting the FM chip and the antenna 101 according to the command of the baseband chip.

The baseband chip is used as a main control device of the mobile terminal for realizing operation of the mobile terminal. The baseband chip is used for controlling working status of the FM chip and conduction of the selecting unit. The baseband chip commands the FM chip to start to work and meanwhile commands the selecting unit to conduct the FM chip and the antenna 101. The baseband chip commands the FM chip to stop working and meanwhile commands the selecting unit to conduct the NFC chip and the antenna 101.

In practical applications, non-contact IC cards or non-contact IC card-readers usually use the NFC function, while the FM-TX is used for transmitting the DAB signal. In other words, the NFC function and the FM-TX function do not operate simultaneously.

The control flow of the mobile terminal is that data produced by the baseband chip of the mobile terminal is broadcast by the FM-TX. Then, the data is transmitted to the FM chip through the I2C bus. Then, the data is modulated as the DAB signal by the FM chip. Then, the DAB signal is broadcast. When this function is operates, the baseband chip serves as the main control device. The baseband chip controls the whole process of broadcasting the data, including when to start to broadcast data and when to stop broadcasting the data. After the data is broadcast, the baseband chip automatically controls the FM chip to stop working to reduce power consumption of the mobile terminal.

As for NFC function, a non-contact IC card is a passive device. An external card reader, as the main control device, controls the process when the NFC function operates. So, the operation of the NFC chip is controlled by the external card reader at all times. Or, even if a card reader operates in the NFC function, the process cannot go on until an external non-contact IC card gets close to the card reader.

In the process of using the mobile terminal, the NFC chip continues to use the antenna 101 to wait for the external card reader or cards to get close. So, the selecting unit of the mobile terminal provided by the present invention is connected to the NFC radio signal by default. In other words, the conduction between the NFC chip and the antenna is set by default. When the mobile terminal activates the FM-TX function, the baseband chip controls the selecting unit to switch the conduction of the FM chip and the antenna 101 before the data is broadcast. The FM chip sends out the data through the antenna 101. The baseband chip is the main control device of the mobile terminal, so it can detect when the data is completely broadcast. After the data is completely broadcast, the baseband chip controls the selecting unit to switch to default status, that is, the conduction of the NFC chip and the antenna 101.

Because the function of connecting the antenna to the NFC chip of the mobile terminal provided by the present invention is by default, no software code needs to be revised. The NFC function of the mobile terminal provided by the present invention does not have to operate deliberately, as other functions of an ordinary mobile terminal are used.

Please refer to FIG. 2 showing the selecting unit. The selecting unit is a simulated monopole double throw switch 102. The simulated monopole double throw switch 102 comprises two fixed contact points. The fixed contact points are connected to the NFC chip and the FM chip, respectively. The switching status of the fixed contact points is directly controlled by the baseband chip. In other words, the switching status of the fixed contact points is unnecessary to be manually operated. The antenna is a dual-band antenna and comprises a two resonance points for realizing transmittance of the NFC radio signal and the TX DAB signal.

In the present invention, the mobile terminal is a cellphone or a mobile TV. In the following, the cellphone using the common antenna performing the FM-TX function and the NFC function is described in detail. The baseband chip controls the conduction between the NFC chip and the antenna at all times. When the FM-TX function of the mobile terminal operates, the FM chip starts to work and the baseband chip gets ready to send out the data. Afterwards, the baseband chip controls the selecting unit to switch to conduction of the dual-band antenna and the FM chip so that the FM-TX data can be broadcast. After the FM-TX data is broadcast, the baseband chip controls the selecting unit to switch to conduct the passage of the NFC chip and the antenna.

In sum, the NFC antenna and the FM-TX antenna are in the low-frequency range, and the NFC function and the FM-TX function have common features, so it is possible to design the mobile terminal using a common antenna performing an NFC function and an FM-TX function in the present invention. The selecting unit of the mobile terminal conducts the passage of corresponding functions. It is unnecessary to use an additional antenna inside the mobile terminal. Thus, the mobile terminal has more spacious capacity. It becomes easier to develop the mobile terminal. The development lifecycle of the mobile terminal is reduced. The circuit layout and structure design of the mobile terminal is improved. Also, the cost of the antenna fabricated mold is reduced because fewer antennae are used.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A mobile terminal using a common antenna to perform a near field communication (NFC) function and a frequency modulation-transmitter (FM-TX) function, comprising:
   a baseband chip;
   an NFC chip, connected to the baseband chip;
   an FM chip, connected to the baseband chip;
   an antenna; and
      a selecting unit, connected to the baseband chip, the NFC chip, the FM chip, and the antenna, for conducting the NFC chip and the antenna or conducting the FM chip and the antenna based on a control of the baseband chip,
      wherein the baseband chip is used for controlling working status of the FM chip and conduction of the selecting unit, the baseband chip commands the FM chip to start to work and meanwhile commands the selecting unit to conduct the FM chip and the antenna, and the baseband chip commands the FM chip to stop working and meanwhile commands the selecting unit to conduct the NFC chip and the antenna.

2. The mobile terminal using a common antenna to perform an NFC function and an FM-TX function of claim 1, wherein the antenna is a dual-band antenna.

3. The mobile terminal using a common antenna to perform an NFC function and an FM-TX function of claim 1, wherein the selecting unit is a simulated monopole double throw switch comprising two fixed contact points, and the two fixed contact points are connected to the NFC chip and the FM chip, respectively.

4. The mobile terminal using a common antenna to perform an NFC function and an FM-TX function of claim 1, wherein the mobile terminal is a cellphone or a mobile TV.

* * * * *